Patented Jan. 11, 1944

2,339,164

UNITED STATES PATENT OFFICE 2,339,164

REFINING VEGETABLE PHOSPHATIDES

Robert Edman Greenfield, Decatur, Ill., assignor to A. E. Staley Manufacturing Company, Decatur, Ill., a corporation of Delaware No Drawing. Application February 24, 1941, Serial No. 380,310

7 Claims. (Cl. 260—403)

The present invention relates to an improved process for refining vegetable phosphatides of the type known as lecithin and lecithin hydrate, and refers in particular to the decolorizing of these phosphatides by the use of sodium chlorite.

Phosphatides such as lecithin and lecithin hydrate are usually recovered commercially from vegetable oil foots or tank settlings by extraction and isolation steps which result in the formation of a relatively pure phosphatide having an unduly dark color. For many purposes it is desirable to decolorize the material and several processes have been suggested for this purpose. The most generally used decolorizing process includes treatment of the phosphatide with a solution of hydrogen peroxide, as described in United States Patent No. 1,893,393. Difficulties are encountered in controlling the hydrogen peroxide decolorizing process, due at least in part to pH changes and adjustments, and the process has the further disadvantages of containing undue quantities of the hydrogen peroxide solution as well as a decolorizing time which may be of the order of 72 hours.

Other decolorizing materials have been tried in connection with the bleaching of phosphatides but none of these have been sufficiently successful to go into commercial use. Examples of such materials are sodium hypochlorite and sodium chlorate. Sodium peroxide and other peroxides have been tried out without success. Permanganates likewise have been used without success. In fact, the characteristics of phosphatides are such as to make it apparent that the problem involved in their decolorization does not comply with expected bleaching characteristics.

The present invention is based upon the discovery that the phosphatides may be more successfully decolorized by the use of sodium chlorite, than by any other known material. The time of the decolorizing treatment is quite short with this material, the quantity necessary for use is considerably less than with other materials, and no deleterious effects are exerted upon the phosphatides by the sodium chlorite.

As an example of the operation of the process in connection with the type of lecithin hydrate produced in accordance with Lund Patent No. 2,090,537, 500 lbs. of lecithin hydrate containing 80 lbs. of phosphatides, 5 lbs. of alcohol and 370 lbs. of water are adjusted to a pH of 6.0 with a concentrated aqueous solution of sodium hydroxide. To this mixture is added 3 lbs. of sodium chlorite dissolved in 25 lbs. of water. The mixture then is heated to 150° F. to 160° F. and this temperature is maintained for three hours or more for completion of the decolorizing operation. Thereafter the decolorized mixture is cooled and the phosphatides are precipitated and washed with acetone. To produce the final product consisting of a mixture of lecithin hydrate with vegetable oil, 20 lbs. of soybean oil are added and the product then is dried under vacuum at not more than 140° F. until no acetone remains. The resulting product consists of 100 lbs. of very light decolorized 80% lecithin.

As an example of the effectiveness of the above bleach, it was found that the product was at least equal in color characteristics to a similar quantity of the raw material treated with 7.5 lbs. of 30% hydrogen peroxide for a period of 72 hours at a temperature conducive to the favorable action of the peroxide. Since the three pounds (3 lbs.) of sodium chlorite contains 1.06 lbs. of oxygen, and since 7.5 lbs. of 30% $H_2O_2$ contains 2.12 lbs. of oxygen, it will be seen that the decolorizing power of the sodium chlorite per unit of oxygen is about twice that of the peroxide. Generally, comparative treatments with quantities of sodium chlorite and hydrogen peroxide having an equivalent amount of oxygen show that the chlorite produces a phosphatide with about ½ the color of the hydrogen peroxide decolorized product in approximately $\frac{1}{4}$ of the time necessary for the action of the hydrogen peroxide.

The pH of the phosphatide mixture may vary somewhat, although it is preferred to utilize a pH of about 6.0 to obtain a desirable color and consistency in the final product. However, the sodium chlorite exercises its effective decolorizing capacity over the pH range of about 3.0 to 8.0.

The temperature employed in the decolorizing operation may likewise vary somewhat. It is not usually preferred to exceed a temperature of 150° to 160° F., and if a much lower temperature is employed the reaction proceeds at a much slower rate.

In the decolorization of phosphatides other than lecithin hydrate, the sodium chlorite is of equal benefit. For instance, in the case of crude phosphatides settled from soybean oil, 100 lbs. of crude phosphatides may be treated with 3 lbs. of the sodium chlorite to provide a decolorized unrefined phosphatide of light color.

A characteristic of the treatment with sodium chlorite is that the decolorized phosphatides do not have the tendency to again become discolored upon standing, this latter tendency being present where the phosphatide has been decolorized by many of the previously tried reagents such as sodium hypochlorite. Also there is no tendency of the material to saponify or hydrolyze the phosphatides or the neutral oil contained therein. The residual material remaining after the completion of the decolorizing operation, is sodium chloride, a harmless material.

The completion of the decolorizing operation with sodium chlorite in a very short time compared with the time necessary to decolorize the material with hydrogen peroxide, for example, is an important factor in the success of my improved process. Where it has been necessary in the case of the use of hydrogen peroxide to treat the phosphatide for a period of time of the order of 72 hours, I can complete the decolorizing process in as short a period of time as 3 hours. The particular time necessary for the treatment will depend upon such factors as the amount of sodium chlorite which is employed, the temperature employed in the decolorizing process and the nature of the phosphatides. Also, of course, the extent to which the decolorization is carried out will determine to some extent the time of treatment, although it usually is preferred to utilize such a quantity of the sodium chlorite as will provide for the desired degree of decolorization with substantial exhaustion of the sodium chlorite.

A further feature of importance in the use of sodium chlorite for decolorizing vegetable phosphatides is that there is no necessity for destroying any residual quantities of the material by special treatments. Due to the relatively short time within which the decolorizing action is complete, the tendency for there to be an unconsumed or unutilized remainder of sodium chlorite is less than in the case of slower acting material such as hydrogen peroxide.

The technic of the utilization of decolorizing substances of this general nature is sufficiently well known in the art as to require no further description. Generally speaking, this technic merely includes the thorough mixture of the decolorizing agent with the material treated and maintaining the material at the proper temperature and pH for the desired time. The various changes which may be made in the procedure described herein without departing from the scope of the invention are to be included in the appended claims.

I claim:

1. The process of decolorizing vegetable phosphatides, which comprises mixing with the phosphatide to be decolorized an aqueous solution of sodium chlorite.

2. The process of decolorizing vegetable phosphatides, which comprises mixing a decolorizing quantity of sodium chlorite with the phosphatide to be decolorized, and maintaining the mixture in a warm condition for a period of time sufficiently long to provide for the substantial decolorization of the phosphatide.

3. The process of decolorizing phosphatides containing lecithin, which comprises subjecting said phosphatides to the action of an aqueous solution of sodium chlorite for a period of time sufficient to provide substantial reduction in the color of the product.

4. The process of decolorizing phosphatides containing lecithin, which comprises mixing sodium chlorite with said phosphatides to be decolorized, and maintaining the mixture at a temperature of the order of 150° to 160° F. for a period of time of the order of 3 hours, the amount of said sodium chlorite being sufficient to provide for a substantial reduction in the color of said phosphatides within such period.

5. The process of decolorizing phosphatides containing lecithin, which comprises subjecting said phosphatides being decolorized to the action of sodium chlorite at a pH of between 3.0 and 8.0 for a period of time sufficient to provide for a substantial reduction in the color of said phosphatides.

6. The process of decolorizing phosphatides containing lecithin, which comprises subjecting said phosphatides to be decolorized to the action of an aqueous solution of sodium chlorite at a pH of 3.0 to 8.0 and at a temperature of the order to 150° F. to 160° F. for a period of approximately 3 hours, the amount of said sodium chlorite being sufficient to provide a substantial reduction in the color of said phosphatides within such period.

7. The process of decolorizing phosphatides containing lecithin, which comprises mixing said phosphatides with an aqueous solution of sodium chlorite and adjusting the pH of the solution to approximately 6.0, the amount of said sodium chlorite being sufficient to provide a substantial reduction in the color of said phosphatides.

ROBERT EDMAN GREENFIELD.